United States Patent [19]

Peterman et al.

[11] Patent Number: 5,122,805
[45] Date of Patent: Jun. 16, 1992

[54] RADIO ACOUSTIC SOUNDING SYSTEM FOR REMOTELY DETERMINING ATMOSPHERIC TEMPERATURE PROFILES

[75] Inventors: Keith R. Peterman, Boulder, Colo.; Don T. Batson, Austin, Tex.

[73] Assignee: Radian Corporation, Austin, Tex.

[21] Appl. No.: 651,441

[22] Filed: Feb. 6, 1991

[51] Int. Cl.$^5$ .................. G01S 13/95; G01S 7/295
[52] U.S. Cl. ..................................... 342/26; 342/52; 342/196
[58] Field of Search ............... 342/26, 22, 52, 196, 342/128, 132; 374/117, 122, 124

[56] References Cited

U.S. PATENT DOCUMENTS

| | | | |
|---|---|---|---|
| 3,975,734 | 8/1976 | Payne | 342/25 X |
| 4,268,828 | 5/1981 | Cribbs et al. | 342/26 |
| 4,370,652 | 1/1983 | Lucchi | 342/26 X |
| 4,481,517 | 11/1984 | Brown | 342/26 |

OTHER PUBLICATIONS

"Temperature and Wind Profiles from Radar Wind Profilers Equipped with Acoustic Sources", G. Peters, Meterol. Rasch., vol. 42, pp. 152-154, Jun. 1990.
"Ratio Acoustic Sounding of the Atmosphere Using an FM-CW Radar", G. Peters, et al., RADIO SCI., vol. 23, No. 4, 1988, pp. 640-646.
"A Combined RAS-/Radar-System", G. Peters et al., pp. 247 and 248 (date and publication unknown).

Primary Examiner—Gilberto Barrón, Jr.
Attorney, Agent, or Firm—Klauber & Jackson

[57] ABSTRACT

A radio acoustic sounding system for detecting temperature profiles in the atmosphere, includes an acoustic transmitting antenna for transmitting an acoustic signal; a RF transmitting antenna for transmitting a RF signal used to detect the transmitted acoustic signal; a receiving antenna for receiving a reflection of the RF signal from the acoustic signal; a RF subsystem including a RF sweep generator for producing a frequency modulated, continuous wave (FM-CW) RF signal, a homodyne receiver for receiving the reflected RF signal and for producing an output audio signal in response thereto, and a distribution unit for supplying the FM-CW RF signal from the RF sweep generator to the RF transmitting antenna for transmission thereby, and to the homodyne receiver as a local oscillation signal so that the received reflected RF signal is phase coherent with the transmitted FM-CW RF signal; a programmable filter for filtering out undesirable frequency components of the output audio signal from the homodyne receiver; an analog-to-digital converter for digitally converting said deliberately aliasing the filtered output audio signal under a controlled set of radar and digital sampling parameters; a central processing unit for determining the temperature profile of the atmosphere in response to the filtered and aliased output RF signal; an array processor for spectrally analyzing the digitized signal from the analog-to-digital converter via a Fourier transform so that the central processing unit can analyze the signal; and an acoustic sweep generator for supplying a FM-CW acoustic signal to the acoustic transmitting antenna, in response to the central processing unit.

27 Claims, 4 Drawing Sheets

RANGE/VELOCITY SPECTRUM FOR NORMAL WIND MEASUREMENT

RANGE/VELOCITY SPECTRUM FOR ACOUSTIC WAVE VELOCITY MEASUREMENT

| NUMBER OF SAMPLES PER SWEEP: | $M$ |
| NUMBER OF RANGE CELLS: | $M/2$ |
| MAXIMUM UNAMBIGUOUS RADIAL VELOCITY: | $V_m$ |
| NOMINAL ACOUSTIC WAVE VELOCITY: | $V_r$ |

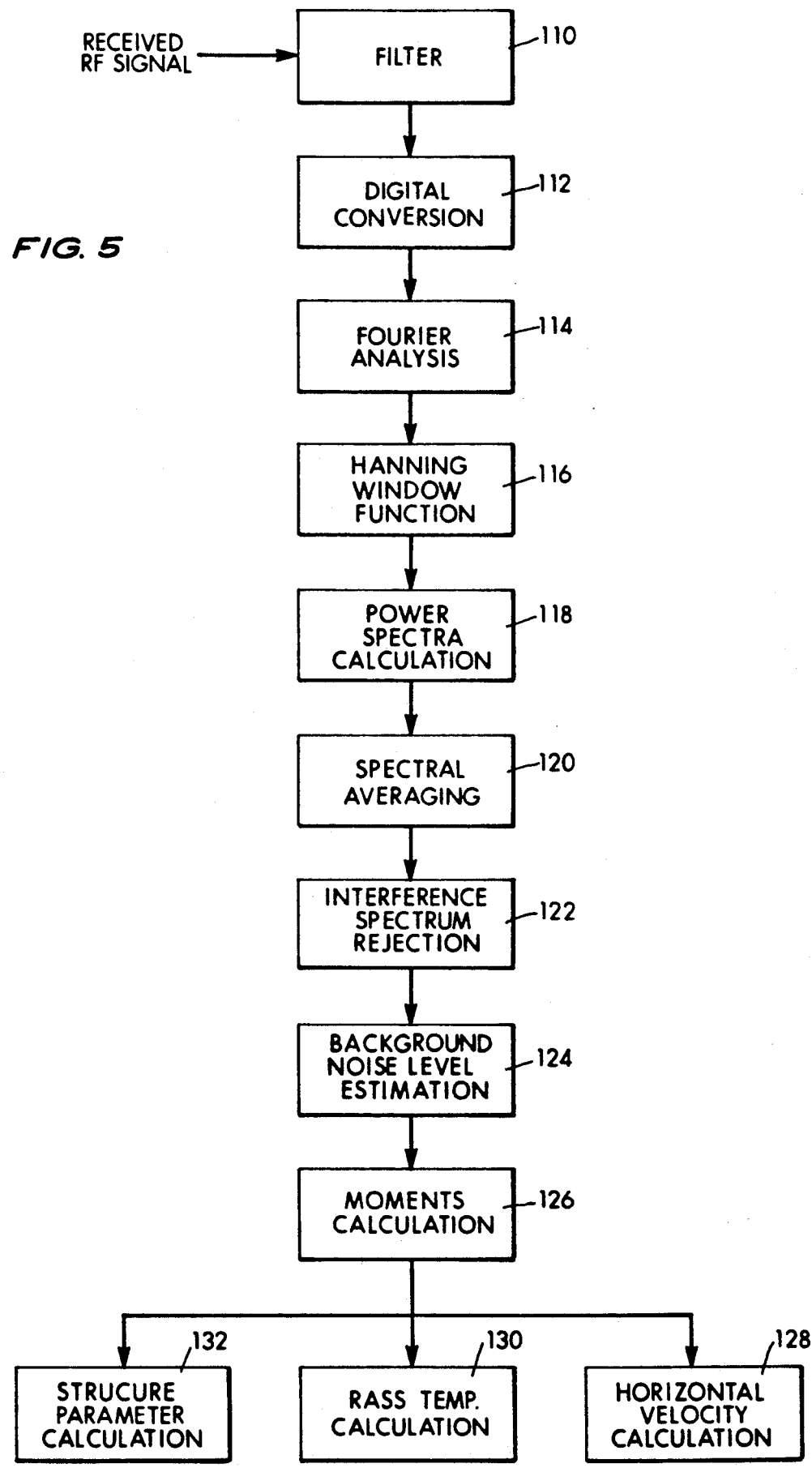

RADIO ACOUSTIC SOUNDING SYSTEM FOR REMOTELY DETERMINING ATMOSPHERIC TEMPERATURE PROFILES

BACKGROUND OF THE INVENTION

The present invention relates generally to radio acoustic sounding systems, and more particularly, is directed to a radio acoustic sounding system (RASS) for use with a FM-CW atmospheric Doppler radar system (FADRS) in order to determine atmospheric temperature profiles.

The radio acoustic sounding system is a known technique for remotely determining atmospheric virtual temperature profiles by combining acoustic and radar techniques. With this system, an acoustic wavefront is tracked by using pulsed Doppler radar. Specifically, the RASS technique uses coherent radar to measure backscattered radiation from fluctuations in atmospheric density to determine the local speed of sound. The fluctuations are induced by an external acoustic source, and the determined local speed of sound of the acoustic wavefront is related to the virtual temperature. The radio acoustic sounding system has been used primarily for measuring boundary layer temperature profiles.

Traditionally, RASS has made use of enhancements in the backscatter by matching the acoustic wavelength of the generated acoustic wavefront to one-half of the radar wavelength, otherwise known as Bragg matching, and by making use of the focusing effect of the spherical wavefronts.

Various acoustic sources have been used, for example, as described in the article "Temperature sounding by RASS with wind profiler radars: a preliminary study", by P. T. May et al. See also "Rass Temperature Sounding Techniques" by R. G. Strauch et al., United States Department of Commerce, National Oceanic and Atmospheric Administration (NOAA), Environmental Research Laboratories, Boulder, Colo., NOAA Technical Memorandum ERL WPL-158, Dec. 1988 (deals only with pulsed Doppler radar systems); the doctoral dissertation "The Theory and Application of the Frequency Modulated, Continuous Wave Doppler Radar" by Richard G. Strauch, University of Colorado, 1976; and the book *FM Radar* by David Luck, McGraw-Hill Publishing, New York, N.Y., 1949.

When a CW acoustic source is used, the backscattered electromagnetic signal will have a frequency shift equal to the transmitted acoustic frequency regardless of the Bragg frequency. Thus, temperature cannot be measured with CW acoustic excitation.

Another acoustic source that has been used produces short acoustic pulses. A short acoustic pulse is one that lies within the radar range volume during the entire observing period, which is typically longer than 0.5 seconds. Because the frequency of the backscattered signal will be Doppler shifted, the backscattered frequency will be the Bragg frequency, regardless of the frequency of the acoustic pulse. As a result, temperature can be determined. However, it has been shown that the influence of horizontal winds in such case will shift the backscattered frequency towards the acoustic frequency for wind speeds in excess of above 10 m/sec.

Still another source of acoustic wave uses long acoustic pulses, in which only a part of the acoustic pulse lies within the resolution volume. The mean frequency of the backscattered signal will lie somewhere between the values for CW acoustic waves and short pulse acoustic waves, for example, 300 m long acoustic pulses. However, because there is a boundary of the acoustic pulse travelling within the radar volume and a part of the acoustic signal intersecting an edge of the radar volume at all times, the spectral signal has two peaks, one at the acoustic frequency and one at the Bragg frequency. Further, if the pulses are repetitive within the observation time or if there is more than one pulse within the radar range volume, additional spectral lines are produced that limit the accuracy to which the Doppler shift (temperature) can be determined.

Finally, a frequency-modulated continuous wave (FM-CW) has been used as the acoustic wave. This acoustic signal has a constant amplitude in which the frequency is modulated by linearly sweeping the acoustic frequency in a sawtooth pattern between 860 and 900 Hz. With this signal, a sharp spectral peak at the Bragg frequency is produced. Thus, only the acoustic energy with a frequency close to the Bragg condition, produces a strong signal. It has been found that a relatively broad frequency sweep can be employed to match the Bragg condition, at all desirable heights simultaneously, while suffering only a minor penalty in the backscatter power.

There are, however, a number of practical considerations with an FM-CW acoustic source. For example, the sawtooth frequency sweep does not put equal power in all frequencies. Thus, the sweep parameters must be varied to produce a smooth averaged spectrum. The magnitude of the variations is proportional to the time-bandwidth product of the frequency sweep. Also, like the pulsed acoustic case, the sweep must not be repetitive within the radar range volume or during the observing period, since otherwise, contaminating spectral lines are produced, thereby degrading the temperature estimates.

The FM-CW acoustic case is the most desirable since the mean and peak powers are the same, and thereby, more efficient use is made of the acoustic transmitter.

However, in the above known systems, a pulsed Doppler radar source has been utilized.

With conventional RASS systems that use pulsed Doppler radar, the minimum altitude in which the temperature can be measured is approximately 100 m. In many situations, however, it is necessary to measure the temperature profile in much lower altitudes, such as for use with air pollution, transport and modeling, for example, in measuring plumes from a smoke stack. Therefore, conventional pulsed Doppler radar RASS is not satisfactory for this purpose.

Further, and related thereto, with conventional RASS systems using pulsed Doppler radar, the spatial resolution is not satisfactory for many commercial applications.

Still further, with such conventional RASS systems, there is the requirement of using a heterodyne receiver in order to perform frequency translations. As a result, the complexity of the system is considerable, requiring additional circuit elements.

Other radio acoustic sounding systems (RASS) have used continuous wave (CW) radar. See, for example, G. Bonino et al., "A metric wave radio-acoustic tropospheric sounder", IEEE Trans. Geosci. Electron., GE-17, pages 179-181, 1979.

Still other systems have used FM-CW radar in conjunction with RASS. See, for example, G. Peters, "Temperature and wind profiles from radar wind profilers equipped with acoustic sources", *Meteorol. Rdsch.*, Vol. 42, pages 152-154, Jun., 1990; G. Peters et al., "Radio Acoustic Sounding of the Atmosphere using a FM-CW Radar", *Radio Sci.*, Vol. 23, No. 4, 1988, pages 640-646; and G. Peters et al., "A Combined RAS-/Radar-System", pages 247 and 248 (date and publication unknown).

In these latter articles, however, no mention was found of deliberately aliasing the output audio signal under a controlled set of radar and digital sampling parameters, so that the homodyne receiver of the FADRS circuitry can be utilized without additional circuitry. Without such aliasing, and assuming use of a homodyne receiver, it would be necessary to use a very high sample rate, thereby making the performance requirements very stringent, and substantially increasing the cost and complexity of the system. If a homodyne receiver is not used, the cost and complexity of the system would increase substantially in the same manner as described above with respect to pulsed Doppler radar RASS.

OBJECTS AND SUMMARY OF THE INVENTION

Accordingly, it is an object of the present invention to provide a radio acoustic sounding system (RASS) that overcomes the aforementioned disadvantages with the prior art.

It is another object of the present invention to provide a radio acoustic sounding system that can be used with a conventional FM-CW atmospheric Doppler radar system, without substantial modification thereof.

It is still another object of the present invention to provide a radio acoustic sounding system that can use all of the existing hardware from a FM-CW atmospheric Doppler radar system so as to eliminate the need for a separate heterodyne receiver and associated circuitry.

It is yet another object of the present invention to provide a radio acoustic sounding system that provides better spatial resolution than known pulsed Doppler systems.

It is a further object of the present invention to provide a radio acoustic sounding system that can achieve temperature measurements closer to the ground than known pulsed Doppler systems.

It is a still further object of the present invention to provide a radio acoustic sounding system that deliberately aliases the output audio signal from the homodyne receiver under a controlled set of radar and digital sampling parameters.

It is a still further object of the present invention to provide a radio acoustic sounding system that is relatively economical and easy to manufacture and use.

In accordance with an aspect of the present invention, a radio acoustic sounding system for detecting temperature profiles in the atmosphere, includes acoustic transmitting antenna means for transmitting an acoustic signal; RF transmitting antenna means for transmitting a frequency modulated, continuous wave RF signal used to detect the transmitted acoustic signal; receiving antenna means for receiving a reflection of the RF signal from the acoustic signal as a reflected RF signal; RF subsystem means for supplying the RF signal to the RF transmitting antenna means and for receiving the reflected RF signal from the receiving antenna means, the RF subsystem including RF sweep generator means for producing a frequency modulated, continuous wave RF signal and for supplying the frequency modulated, continuous wave RF signal to the RF transmitting antenna means, and homodyne receiver means for receiving the reflected RF signal and for producing an output audio signal in response thereto; filter means for filtering out undesirable frequency components of the output audio signal from the homodyne receiver means; analog-to-digital conversion means for digitally converting and deliberately aliasing the filtered output audio signal under a controlled set of radar and digital sampling parameters; and central processing means for determining the temperature profile of the atmosphere in response to the filtered and aliased output audio signal.

In accordance with another aspect of the present invention, a radio acoustic sounding system for detecting temperature profiles in the atmosphere, includes acoustic transmitting antenna means for transmitting an acoustic signal; RF transmitting antenna means for transmitting a frequency modulated, continuous wave RF signal used to detect the transmitted acoustic signal; receiving antenna means for receiving a reflection of the RF signal from the acoustic signal as a reflected RF signal; RF subsystem means for supplying the RF signal to the RF transmitting antenna means and for receiving the reflected RF signal from the receiving antenna means, the RF subsystem means including RF sweep generator means for producing a frequency modulated, continuous wave RF signal, homodyne receiver means for receiving the reflected RF signal and for producing an output audio signal in response thereto, and distribution means for supplying the frequency modulated, continuous wave RF signal from the RF sweep generator means to the RF transmitting antenna means for transmission thereby, and to the homodyne receiver means as a local oscillation signal so that the received reflected RF signal is phase coherent with the transmitted frequency modulated, continuous wave RF signal; programmable filter means for filtering out undesirable frequency components of the output audio signal from the homodyne receiver means; analog-to-digital conversion means for digitally converting and deliberately aliasing the filtered output audio signal under a controlled set of radar and digital sampling parameters; central processing means for determining the temperature profile of the atmosphere in response to the filtered and aliased output audio signal; array processor means for spectrally analyzing the digitized signal from the analog-to-digital conversion means via a Fourier transform so that the central processing means can analyze the signal; and acoustic sweep generator means for producing a frequency modulated, continuous wave acoustic signal and for supplying the frequency modulated, continuous wave acoustic signal to the acoustic transmitting antenna means, in response to the central processing means.

In accordance with still another aspect of the present invention, a method of detecting temperature profiles in the atmosphere, comprises the steps of transmitting an acoustic signal; producing a frequency modulated, continuous wave RF signal; transmitting the frequency modulated, continuous wave RF signal for detecting the transmitted acoustic signal; receiving a reflection of the RF signal from the acoustic signal as a reflected RF signal; producing an output audio signal from the reflected RF signal, that is phase coherent with the transmitted frequency modulated, continuous wave RF signal; filtering out undesirable frequency components of the output audio signal; deliberately aliasing the filtered output audio signal by converting the output audio signal to digital form under a controlled set of radar and digital sampling parameters; and converting the filtered and aliased output audio signal to digital form; and determining the temperature profile of the atmosphere in response to the filtered output RF signal.

BRIEF DESCRIPTION OF THE DRAWINGS

FIG. 5 is a flow chart diagram used for describing the operation of the present invention.

DETAILED DESCRIPTION OF A PREFERRED EMBODIMENT

Figure 1:
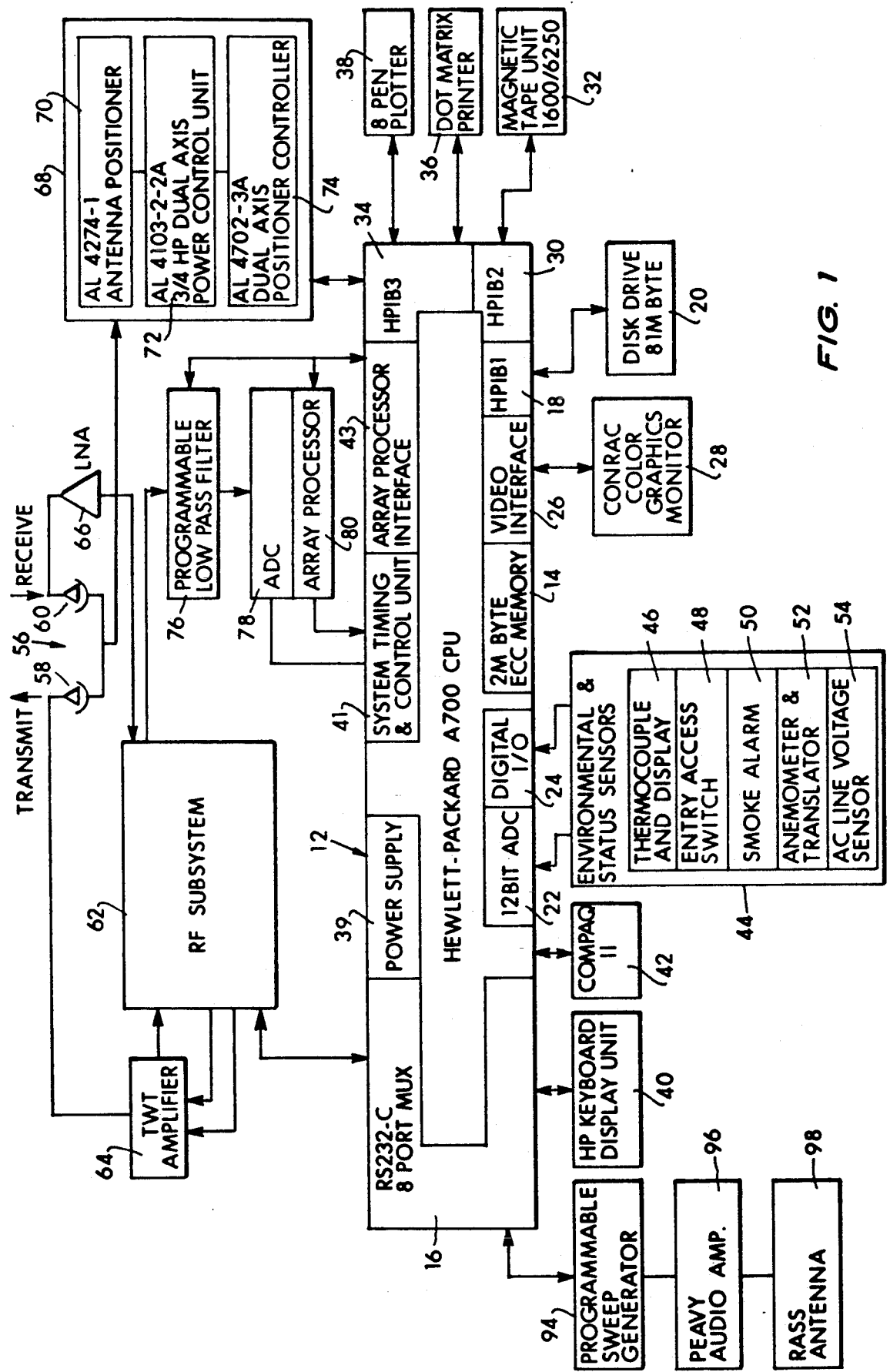
FIG. 1 is a block diagram of a radio acoustic sounding system used with a FM-CW atmospheric Doppler radar system, according to the present invention.

Before discussing the specific circuitry of the radio acoustic sounding system (RASS) according to the present invention with a FM-CW atmospheric Doppler radar system, a brief description of the basis therefore will be discussed.

One method for using radar to measure the speed of sound in air involves finding the Bragg condition of:

$$\lambda_a = \lambda_r/2$$

where $\lambda_a$ is the acoustic wavelength and $\lambda_r$ is the radar wavelength. Correspondingly, the Bragg frequency can be written as follows:

$$f_B = 2C_a/\lambda_r$$

where $C_a$ = the speed of sound.

If a band of acoustic frequencies is transmitted continuously such as with a swept acoustic source (FM-CW audio), the radar processor will detect the acoustic frequency that matches the Bragg condition. The radar processor will then trace the Bragg response. The first moment of the Doppler spectrum is the mean acoustic velocity, which can easily be related to the virtual temperature of the atmosphere.

The acoustic wave to be detected will be assumed to have a nominal radial velocity on the order of 320 m/s, and it is desired to detect the actual velocity, which will be some few m/s different from the nominal velocity, as a function of range.

For ease of explanation, it will be assumed that the ratio of sampling time within a sweep to total sweep duration will be unity, and the radar wavelength will be 0.1 meter. In such case, the frequency corresponding to Doppler velocity V is:

$$f_D = 2V/\lambda_r$$

For the chosen parameters, the frequency of the nominal velocity of sound is:

$$f_{ref} = (2)(320)/(0.1) = 6400 \text{ Hz}$$

For the zeroth range cell, the receiver output frequency corresponding to the return signal from the acoustic wave will be 6400 Hz. For other range cells, the output frequency will be 6400 Hz, plus a frequency corresponding to the range of the range cell. If operating parameters are chosen such that the receiver output frequency corresponding to the last range cell is 6400 Hz for the range term and an additional 6400 Hz for the Doppler term (or 12,800 Hz), then the Doppler components will exactly alias back into the analysis band because the Nyquist, or "folding" frequency is 6400 Hz. In other words, the range cells for the acoustic wave will be reverse-ordered from the normal analysis with the zeroth range cell corresponding to the highest frequency in the analysis band and the last range cell corresponding to zero frequency.

Specifically, for RASS processing, the nominal acoustic wave propagation velocity $V_{ref}$ relates to other system parameters as follows:

$$V_{ref} = (M\lambda_r)/(4T)$$

where M is the number of digital samples. Accordingly, the maximum unambiguous radial velocity about the nominal acoustic velocity will be:

$$V_{max} = \lambda_r/(4T)$$

Therefore, under the conditions stated, the velocity of the acoustic wave over the velocity band between $V_{ref} - V_{max}$ and $V_{ref} + V_{max}$ can be unambiguously analyzed in the range cell. Therefore from the above equations, there is a fundamental constraining relationship:

$$M = V_{ref}/V_{max}$$

From these equations, it will be appreciated that a FM-CW atmospheric Doppler radar system can perform the radio acoustic sounding system technique within reasonable limits with only the addition of an acoustic sound source and a modification of the filtering of the receiver output before spectrum analysis. It is noted that the receiver output frequencies of interest for measurement of acoustic sound velocity begin at the frequency band which would normally be deliberately suppressed by the low pass filter in the FM-CW atmospheric Doppler radar system receiver output, which is only designed for detecting wind profiles. In other words, it is necessary to deliberately alias into the analysis band of the FM-CW atmospheric Doppler radar system some frequencies which are normally desired to be suppressed. These frequency components are between the Nyquist frequency and twice the Nyquist frequency (which is the sampling frequency for the analog-to-digital converter). Therefore, the normal low pass filter cutoff frequency setting of the FM-CW atmospheric Doppler radar system cannot be used.

Thus, with the present invention, in order to change from measurement of winds by the FM-CW atmospheric Doppler radar system, to the measurement of acoustic sound velocity, requires only a change in the receiver output filter settings if the operating parameters are chosen properly.

Figure 4A:
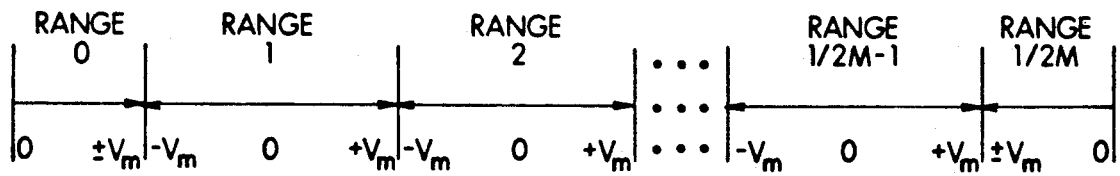
FIG. 4A illustrates the range/velocity cell configuration of the spectrum analyzer output for the normal FM-CW atmospheric doppler radar system (FADRS) operation.
Figure 4B:
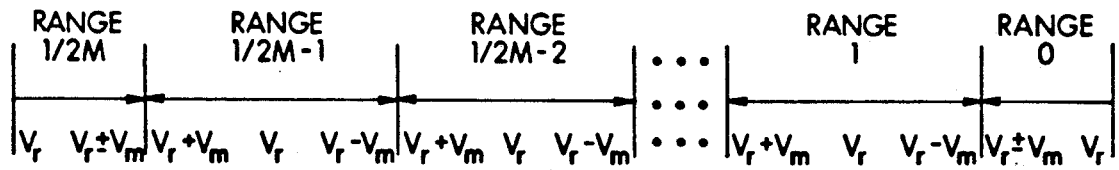
FIG. 4B illustrates the range/velocity cell configuration of the spectrum analyzer output for the radio acoustic sounding system (RASS) operation according to the present invention.

FIGS. 4A and 4B illustrate the range/velocity cell configurations of the spectrum analyzer output for both the normal FM-CW atmospheric doppler radar system (FADRS) operation and the radio acoustic sounding system (RASS) operation according to the present invention.

One possibility of varying the FADRS operating parameters for RASS operation according to the present invention is as follows:

| Number of range cells | Maximum range, m | Max Vel Deviation about snd vel, m/s | Sweep Rate MHz/ms |
|---|---|---|---|
| 4 | 200 | 40 | 4.8 |
| 8 | 400 | 20 | 2.4 |
| 16 | 800 | 10 | 1.2 |
| 32 | 1600 | 5 | 0.6 |

| | |
|---|---|
| Range Resolution: | 50 meters |
| Velocity Resolution: | 0.3125 meters/sec |
| Nominal Sound Velocity: | 320 meters/sec |
| Sweep Starting Frequency: | 3.0 GHz |
| ADC Sample Frequency: | 12,800 samples/sec |
| FFT size: | 2048 points |
| Sweep Bandwidth: | 3.0 MHz |
| Receiver Filter Passband: | 6400-12800 Hz |

Referring now to the drawings in detail, and initially to FIG. 1 thereof, a radio acoustic sounding system (RASS) 10 according to the present invention, includes a central processing unit 12, for example, a Hewlett-Packard A700 central processing unit having a 2 MB ECC internal memory 14 (HP Model No. 12111C), an asynchronous eight channel multiplexer 16 (HP Model No. 1204D), an input bay 18 (HP Model No. 12009A) which communicates with an external hard disk drive 20 (HP Model No. 7957B), an eight channel, twelve bit analog-to-digital (A/D) converter 22 (HP Model No. 12060B), a 32 channel digital input-output (I/O) port 24 (HP Model No. 12063A), a color video interface 26 (HP Model No. 12065A) for interfacing with a color graphics monitor 28 (Conrac Model No. 7211C19), a second input bay 30 which communicates with an external magnetic tape unit 32 (HP Model No. 7980A), a third input bay 34 which can communicate with a printer 36, such as a dot matrix printer (HP Model No. 2235B), or a plotter 38, such as an eight pen plotter (HP Model No. 7550A), and an internal power supply 39, such as a Hewlett-Packard HP1000 power supply. A system console or keyboard 40 (HP Model No. 700/92) for inputting information and commands, and an input/output (I/O) interfacing computer 42, such as that sold by Compaq Corporation under the designation Compaq II, are also connected to central processing unit 12. More importantly, central processing unit 12 includes a system timing and control unit 41 and an array process interface 43, both of which will be described in more detail hereinafter.

Other miscellaneous elements are also connected with central processing unit 12. For example, there is an environmental and status sensor group 44 connected with central processing unit 12 that provides information on external conditions just outside of the FM-CW atmospheric Doppler radar system, in order to prevent misoperation of the electronics. Specifically, environmental and status sensor group 44 includes a thermocouple 46, for example, sold by Omega, an entry access switch 48 to restrict access and for example, sold by Omeron (Model No. D4C-1601), a smoke alarm 50, an anemometer and translator 52 for measuring the force or speed of the wind and for example, sold by Met-One, and an AC line voltage sensor 54. Thus, for example, data acquisition by the receiving antenna (to be described later) may be terminated by high winds, a TWT amplifier fault, a power shutdown, the smoke alarm or overtemperature in the enclosure of the system.

RASS 10 further includes a transmitter-receiver (transceiver) subsystem 56 which transmits RF radar signals used for detection and which receives the backscattered radiation from fluctuations in atmospheric density as result of the transmitted RF radar signals, all under the control of central processing unit 12. Specifically, transceiver subsystem 56 includes a transmitting antenna 58 and a receiving antenna 60 for transmitting the RF signals and for receiving the backscattered radiation from fluctuations in atmospheric density, respectively, under the control of an RF subsystem 62, such as that sold by Erbtec Engineering of Boulder, Colo., and which, in turn, is controlled by central processing unit 12. Antennae 58 and 60 are preferably ten foot diameter high performance series parabolic reflector antennae, for example, manufactured by Mark Antennas Division of Radiation Systems, Inc. Preferably, the antennae include shrouds, planar radomes and feeds that are specially designed to meet the performance requirements of the radio acoustic sounding system.

RF subsystem 62 supplies RF signals to transmitting antenna 58 through a TWT (travelling wave tube) amplifier 64, which is a high powered amplifier necessary for transmission of the radar signals. TWT amplifier 64 amplifies the signal to be transmitted to a power level of at least 220 watts. On the input side, the signals received by receiving antenna 60 are supplied back to RF subsystem 62 through a low noise amplifier (LNA) 66, such as one sold by Miteq under Model No. AFD3024030, in order to boost the weak signals received at receiving antenna 60 and to overcome losses in the cables used to transport the signals to RF subsystem 62.

The positions of antennae 58 and 60 are controlled by an antenna positioning subsystem 68 in order to control the aiming directions thereof for transmission and reception. Antenna positioning subsystem 68 includes an elevation-overazimuth antenna positioner 70 which includes the actual motor drives for positioning the antennae, a dual axis power control unit 72 for selectively supplying power to antenna positioner 70 in order to drive one or both of the antennae, and a dual axis positioner controller 74 which supplies the control signals to dual axis power control unit 72 to control the supply of power therefrom. Dual axis positioner controller 74 is interfaced with input bay 34 of central processing unit 12 for control thereby, as is known in the art. Antenna positioner 70, dual axis power control unit 72 and dual axis positioner controller 74 are conventional systems, sold for example, by Orbit Technology of Israel under Model Nos. AL 4274-1, AL 4103-2 2A, and AL-4702-3A, respectively.

Transceiver subsystem 56 further includes a programmable low pass filter 76 which filters out undesirable frequency components from the signal supplied from RF subsystem 62 to central processing unit 12. Programmable low pass filter 76 is programmed by central processing unit 12 in accordance with the signal transmitted by transmitting antenna 58. The output from programmable low pass filter 76 is supplied to an analog-to-digital converter (ADC) 78 which converts the analog signal to digital form, with the sampling rate of ADC 78 being controlled by central processing unit 12. The sampling rate determines the aliasing of the received signal, or in other words, the Nyquist criterion. Thus, aliasing occurs under a controlled set of radar and digital sampling parameters, as described in detail above. The digitized output signal from ADC 78 is supplied to an array processor 80 which is interfaced with the aforementioned array processor interface 43 of central processing unit 12. Array processor 80 is a spectral analyzer that reviews the spectrum of the input data via a Fourier transform so that central processing unit 12 can analyze the data. Array processor interface 43, ADC 78 and array processor 80 are, for example, sold by Anlogic under Model Nos. AP500, ADC510-60 and AP500, respectively.

Figure 2:
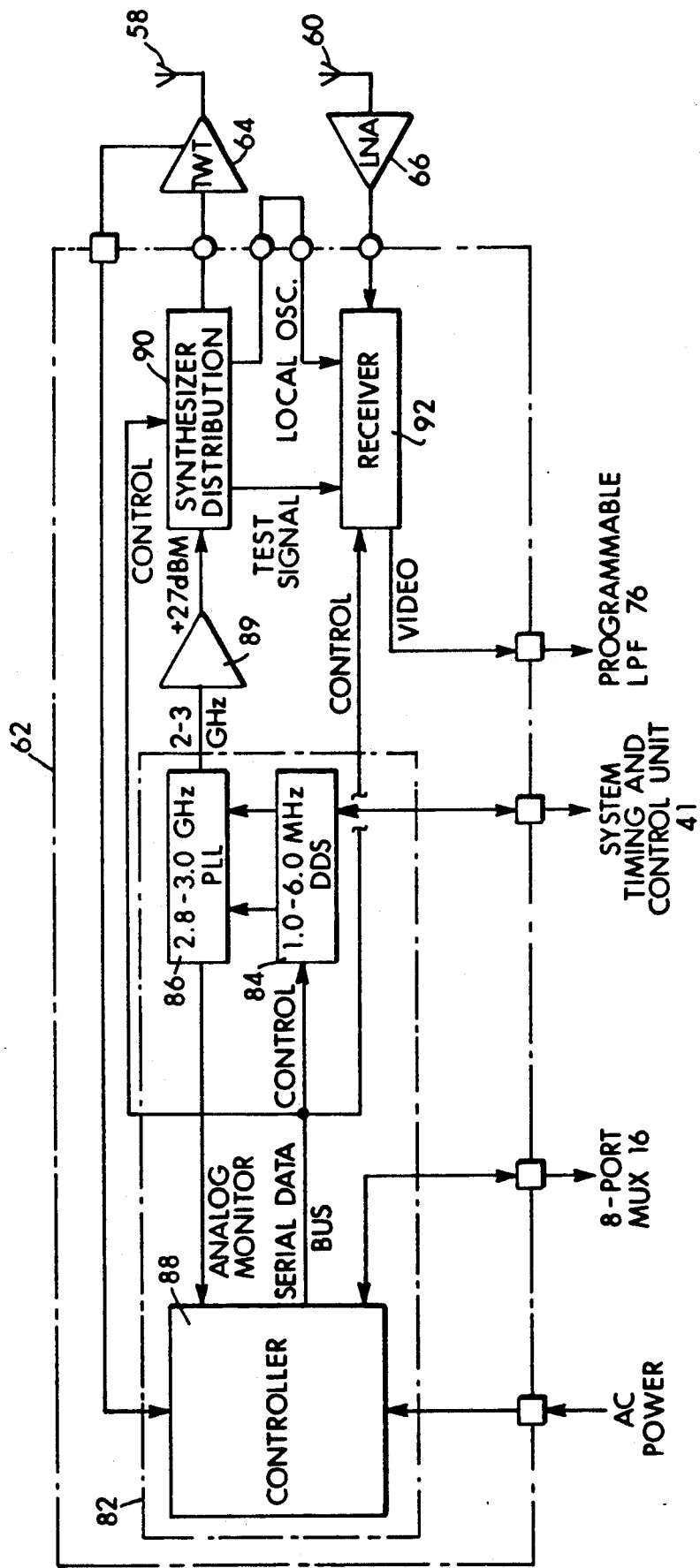
FIG. 2 is a circuit diagram of the RF subsystem of the radio acoustic sounding system of FIG. 1.

Referring now to FIG. 2, the circuit diagram for RF subsystem 62 includes a sweep generator 82 constituted by a direct digital synthesizer (DDS) 84, a phase-locked loop (PLL) 86 and a controller 88. DDS 84 generates a 4 to 6 MHz swept frequency utilized in the generation of the swept radar signal, as well as a 20 MHz precision reference signal, both signals being supplied to PLL 86. DDS is controlled by central processing unit 12 with respect to its synthesized sweep control, and in this regard, is connected to system timing and control unit 41 of central processing unit 12.

PLL 86 generates the 2.8 to 3.0 GHz signal that is directly utilized by the radar. Controller 88 monitors and controls the RF modules within RF subsystem 62, communicates with central processing unit 12, and monitors and controls TWT amplifier 64 used to power transmitting antenna 58. In this regard, controller 88 is connected with eight port multiplexer 16 of central processing unit 12 through a RE-232 communications line, with DDS 84 through a serial data bus, and with PLL 86 to monitor the same.

As a result of the above, PLL 86 supplies the 2.8 to 3.0 GHz signal to a solid state one watt amplifier 89 (ZHL-42), which is necessary to generate sufficient RF power to drive TWT amplifier 64. For example, amplifier 89 adds 27 dBm to the signal.

The amplified signal from amplifier 89 is supplied to a synthesizer distribution circuit 90 which divides up the signal from PLL 86, sets the required levels of the signals and distributes these signals to TWT amplifier 64, a test signal generator (not shown) and a receiver 92 which forms part of RF subsystem 62.

Receiver 92 is a homodyne receiver, which is a direct conversion receiver or baseband detector that converts the input signal to an output audio signal. Specifically, with receiver 92, the local oscillation signal is the same as that used for generating the necessary transmission signal. This is much different from a heterodyne receiver used in the conventional RASS systems with pulsed Doppler radar. With a heterodyne receiver, it is necessary that there be a time-domain coherent integration. As a result, there is the need to perform quadrature detection and complex sampling of the receiver output. Because such process uses an intermediate frequency, it lends itself to relatively straightforward frequency translation of received data. Such is not the case with a homodyne receiver. With the present homodyne receiver, the received signal is phase coherent with the transmitted signal, since there is only one local oscillation frequency, at the carrier frequency. As a result, the present invention can use the homodyne receiver of the known FM-CW atmospheric Doppler radar system, without the need to provide additional circuity of a heterodyne receiver which is necessary with pulsed Doppler radar systems.

It will be appreciated that, because of the use of homodyne receiver 92, the present invention provides deliberate aliasing of the receiver output data by appropriate choice of the operating parameters of the FM-CW atmospheric Doppler radar system.

Both synthesizer distribution circuit 90 and receiver 92 are controlled by the aforementioned serial data bus, by controller 88. The output audio signal from receiver 92 is supplied to programmable low pass filter 76.

It will be appreciated from the above that RF subsystem performs numerous functions, including generation of a precision frequency ramped RF signal, amplification and transmission of the RF radar signal, receiving the returned RF radar signal, generation of a test RF signal for automatic performance evaluation, and providing a communications link to central processing unit 12.

The general specifications of RF subsystem 62 are that the subsystem produces a signal in the 2.8 to 3.0 GHz frequency range, with a starting frequency in such range. The minimum sweep rate is preferably 4.6656 KHz/ms and the maximum sweep rate is preferably at least equal to 4 MHz/ms, with the sweep width being adjustable preferably in 0.232830644 Hz steps. Preferably the gain range of receiver 92 is 0 to 60 dB in 10 dB steps.

Many of the above elements are known for use with a FM-CW atmospheric Doppler radar system that measures wind profiles in the atmosphere. Of course, there is no need for aliasing the output audio signal from the homodyne receiver in a conventional FADRS. When the above-described apparatus is used for a FM-CW atmospheric Doppler radar system, a RF radar signal is transmitted by transmitting antenna 58, and the backscattered radiation from fluctuations in atmospheric density is received by receiving antenna 60. The received signals are then normally passed through programmable low pass filter 76, ADC 78 and array processor 80 to central processing unit 12 which determines the wind profile in the atmosphere therefrom.

The present invention provides an improvement thereon, and specifically, utilizes the above-described arrangement in conjunction with the generation of acoustic signals to determine temperature profiles in the atmosphere. In this regard, it will be appreciated that the wind velocities measured by the aforementioned FM-CW atmospheric Doppler radar system portion are much less than acoustic velocities of sound waves travelling through the atmosphere. Accordingly, programmable low pass filter 76 must be programmed differently to accept a higher end of the signal spectrum. Such programming will suppress the lower, interfering frequency components from winds with much lower radial velocities. Alternatively, a band pass filter can be used, such as the Wavetek model 751A band pass filter, or the Wavetek model 753A dual channel, high pass/low pass filter.

With the present invention, central processing unit 12 controls a programmable sweep generator 94 to generate a signal corresponding to the audio signal range. This signal is amplified by an amplifier 96 and supplied to a further transmitting antenna 98 by which the audio signals are transmitted to the atmosphere. In such case, antenna positioning subsystem 68 controls transmitting antenna 58 and receiving antenna 60 to point only straight up to the zenith angle. The acoustic signals, as with the radar signals, in the present invention, are preferably FM-CW signals, and antenna 98 is preferably a 1.2 meter acoustic antenna.

Figure 3:
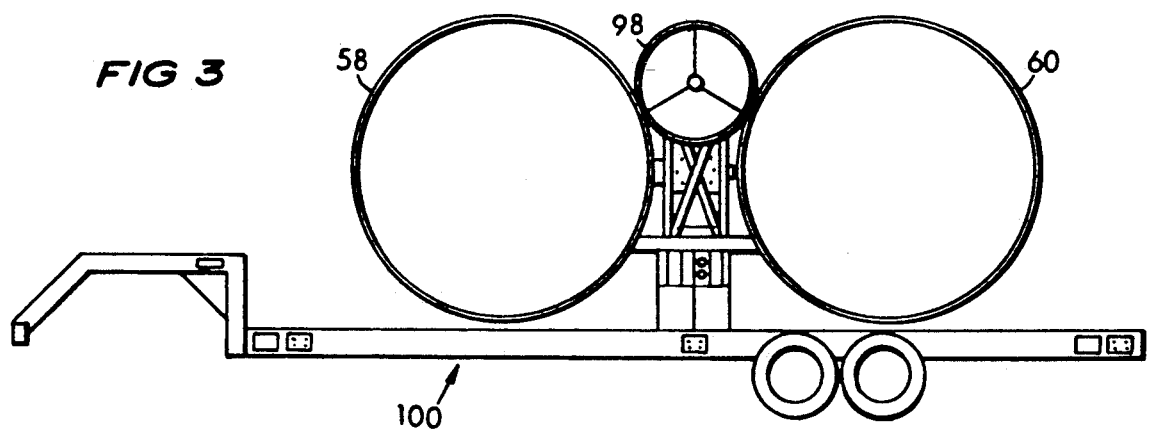
FIG. 3 is schematic diagram of the transportable equipment enclosure for carrying the radio acoustic sounding system of FIG. 1.

All of the above components are mounted in a transportable equipment enclosure 100, as shown in FIG. 3.

In operation of the FADRS for wind profiling, a swept frequency is transmitted. The received signal is the sum of noise and reflections of the received signal from turbulence in the atmosphere. The reflection waveform is delayed by the travel time to the scattering volume, and also experiences a Doppler shift in frequency proportional to the radial velocity of the scattering volume.

In the receiver, the received signal is mixed with a replica of the transmitted waveform. The mixing process converts the travel delays to frequency shifts, so the frequency of the scattered signal from a range gate is the sum of its range and radial velocity contributions. By carefully selecting FM-CW parameters, such as sweep period and sweep rate, the range and radial velocity information can be unambiguously extracted from the mixer output signal.

In the RASS temperature profiling mode, an acoustic beam is transmitted by antenna 98, coaxially with the radar beam from antenna 58. The radar beam will scatter from the acoustic beam, with a Doppler shift at each range proportional to the speed of sound at that range. Since the speed of sound is a known function of temperature, spectral analysis of the return signal can be converted to a temperature profile.

A difference in processing is required for the RASS operation. Specifically, for wind profile operation, the Doppler shifts are small, corresponding to radial velocities less than 5 meters/second. The sound velocity is much higher, that is, about 320 meters/second, so that the Doppler shift is much higher. The signal processing for RASS is adjusted to analyze for a range of radial velocities around 320 meters/second, rather than the range near zero which is required for wind profiling.

The various steps necessary to perform the RASS operation with the present invention will now be described with respect to the flow chart diagram of FIG. 5.

Specifically, in step 110, before sampling, the mixer output from receiver 92 is passed through filter 76 to limit the signal to an unambiguous range of frequencies. For RASS operation, a low pass or bandpass filter corresponding to the expected range of sound speeds near 320 meters/second, is required. It is noted that, for wind profile operation with FADRS, the low pass filter corresponds to radial velocities near zero.

Then, in step 112, the sweep repetition period, which is one of the FM-CW parameters, is synchronized with a harmonic of the power line frequency so that a filter before spectral analysis will produce sharp nulls at multiples of the power line frequency (nominally 60 Hz). By also selecting the sampling rate within each sweep appropriately, this filter will also have nulls at the frequencies of zero-velocity targets in each range gate. This is accomplished by selecting the sampling rate in ADC 78.

In step 114, a one dimensional Fast Fourier Transform (FFT) is performed on the sampled data from ADC 78 from multiple sweeps by array processor 80. The result is complex spectra in FFT bins, with the mapping of the frequency bins to range and radial velocity or temperature bins depending on the sweep and sampling parameters.

A time-domain Hanning window function is then applied by array processor 80 to the signal in step 116, to reduce the range spreading effect, which causes the energy from strong range/velocity cells to leak into other cells. This leakage is caused by sidelobes of the FFT bin response functions. The Hanning window reduces the sidelobe levels, at the expense of a slight widening of the main lobe widths.

In step 118, the power spectra are computed in array processor 80. The power spectral estimate for each FFT bin is the square root of the sum of the squares of the real and imaginary components of the transform for that bin.

The power spectral estimates for each bin are then averaged by array processor 80 in step 120, to improve the signal-to-noise (S/N) ratio. This is "incoherent" averaging, because the phase relationships between subsequent FFTs are not retained. The number of spectra averaged is specified by the configuration parameters. The gain in signal-to-noise ratio is directly proportional to the number of spectra averaged.

In step 122, spurious or large return signals from scatterers other than clear air turbulence, such as from airplanes, are removed by central processing unit, so that they will not distort the further processing steps.

To decide whether a clear-air return has been received, and to compute its signal level, an estimate of the background noise level is made in step 124 by central processing unit 12. An algorithm developed by Hildebrand and Sekhon, *Journal of Applied Meteorology*, Oct., 1974, pages 808-811, is used for this purpose. The algorithm estimates the noise level by comparing the spectral estimates with white noise statistics.

Central processing unit 12, in step 126, then computes the spectral moments, which are a parameterized description of a spectral peak which is hypothesized to be caused by scattering from atmospheric turbulence of a RASS acoustic wave. The moments are computed with standard statistics applied to the averaged spectra above the noise level estimate. The zeroth moment is a measure of the power of the return signal; the first moment is a measure of the frequency of the return (proportional to radial wind velocity or RASS temperature); and the third moment is proportional to the spectral width.

A horizontal velocity calculation is then performed by central processing unit 12 in step 128. Specifically, the basic wind measurement is the radial velocity for a beam pointed in some direction, that is, azimuth and declination. Two different methods for combining multiple radial velocities to compute horizontal winds are implemented.

The first is VAD (Velocity Azimuth Display). In this method, the antenna is rotated for one or more full rotations, with the beam pointed down from the vertical by 15 to 20 degrees. A constant wind field would produce a sinusoidal radial velocity as a function of azimuth. A best-fit sinusoid is computed for the radial velocity time function, and the wind speed and direction are computed from the amplitude and phase of the sinusoid.

The second method uses radial velocities for three beam directions, namely a vertical beam and two tilted beams separated in azimuth by 90 degrees. Trigonometric relations are used to convert the three radial velocities to a vertical wind velocity and the horizontal wind speed and direction.

In step 130, central processing unit 12 computes the temperature profile from the known relationship between the speed of sound and temperature, since it is known that the radial velocities move away from the antenna near the speed of sound (about 320 m/s).

Finally, in step 132, central processing unit 12 performs a structure parameter calculation. Specifically, the refractive index structure parameter is proportional to the amount of scattered power at each altitude. The scattered power is the energy of the spectra peak above the noise estimate, estimated as the zeroth moment in step 126 above. The power is corrected for electronic and signal processing gains, propagation losses, and scattering volume dimensions, to yield the desired structured parameter estimate.

As discussed above, with conventional pulsed Doppler radar RASS, the minimum altitude in which the temperature can be measured is approximately 100 meters. In many situations, however, it is necessary to measure the temperature profile in much lower altitudes, such as for use with air pollution, transport and modeling, for example, in measuring plumes from a smoke stack. With the present invention as described above, RASS 10 can measure the virtual temperature as low as 15 meters.

Further, and related thereto, with conventional RASS systems using pulsed Doppler radar, the spatial resolution is not satisfactory for many commercial applications. This is not the case the RASS 10 according to the present invention.

Still further, with such conventional RASS systems, there is the requirement of using a heterodyne receiver in order to perform frequency translations. As a result, the complexity of the system is considerable, requiring additional circuit elements. With RASS 10 according to the present invention, a homodyne receiver 92 is used, which is already part of the FM-CW atmospheric doppler radar system (FADRS), and accordingly, it is only necessary to modify the filter parameters.

With the present radio acoustic sounding system (RASS) using FM-CW radar, the output audio signal from the homodyne receiver is deliberately aliased under a controlled set of radar and digital sampling parameters, as described above, so that the homodyne receiver of the FADRS circuitry can be utilized without additional circuitry. Without such aliasing, and assuming use of a homodyne receiver, it would be necessary to use a sample rate much higher than that required by the present invention, thereby making the performance requirements much more stringent than the present invention, and substantially increasing the cost and complexity of the system. If a homodyne receiver is not used, the cost and complexity of the system would increase substantially in the same manner as described above with respect to pulsed Doppler radar RASS.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A radio acoustic sounding system for detecting temperature profiles in the atmosphere, comprising:
   a) acoustic transmitting antenna means for transmitting an acoustic signal;
   b) RF transmitting antenna means for transmitting a frequency modulated, continuous wave RF signal used to detect said transmitted acoustic signal;
   c) receiving antenna means for receiving a reflection of said RF signal from said acoustic signal as a reflected RF signal;
   d) RF subsystem means for supplying said RF signal to said RF transmitting antenna means and for receiving said reflected RF signal from said receiving antenna means, said RF subsystem including:
      i) RF sweep generator means for producing a frequency modulated, continuous wave RF signal and for supplying said frequency modulated, continuous wave RF signal to said RF transmitting antenna means, and
      ii) homodyne receiver means for receiving said reflected RF signal and for producing an output audio signal in response thereto;
   e) filter means for filtering out undesirable frequency components of the output audio signal from said homodyne receiver means;
   f) analog-to-digital conversion means for digitally converting and deliberately aliasing said filtered output audio signal under a controlled set of radar and digital sampling parameters; and
   g) central processing means for determining the temperature profile of the atmosphere in response to said filtered and aliased output audio signal.

2. A radio acoustic sounding system according to claim 1, further including acoustic sweep generator means for producing a frequency modulated, continuous wave acoustic signal and for supplying said frequency modulated, continuous wave acoustic signal to said acoustic transmitting antenna means, in response to said central processing means.

3. A radio acoustic sounding system according to claim 1, further including amplifier means for amplifying said frequency modulated, continuous wave RF signal supplied to said RF transmitting antenna means from said RF sweep generator means.

4. A radio acoustic sounding system according to claim 1, further including low noise amplifier means for boosting the received RF signal supplied from said receiving antenna means to said RF subsystem means.

5. A radio acoustic sounding system according to claim 1, wherein said filter means includes a programmable filter controlled by said central processing means.

6. A radio acoustic sounding system according to claim 1, wherein said RF sweep generator means includes synthesizer means for generating a swept frequency signal in response to said central processing means, and phase-locked loop means for phase locking said swept frequency signal to produce said frequency modulated, continuous wave RF signal.

7. A radio acoustic sounding system according to claim 6, wherein said frequency modulated, continuous wave RF signal has a frequency in the range of 2.8 to 3.0 GHz.

8. A radio acoustic sounding system according to claim 1, wherein said RF subsystem means further includes distribution means for supplying said frequency modulated, continuous wave RF signal from said RF sweep generator means to said RF transmitting antenna means, and to said homodyne receiver means as a local oscillation signal so that said received reflected RF signal is phase coherent with the transmitted frequency modulated, continuous wave RF signal.

9. A radio acoustic sounding system according to claim 1, further including array processor means for spectrally analyzing said digitized signal from said analog-to-digital conversion means via a Fourier transform so that said central processing means can analyze said signal.

10. A radio acoustic sounding system according to claim 1, further including antenna positioning means for positioning said RF transmitting antenna means and said receiving antenna means in response to said central processing means.

11. A radio acoustic sounding system for detecting temperature profiles in the atmosphere, comprising:
 a) acoustic transmitting antenna means for transmitting an acoustic signal;
 b) RF transmitting antenna means for transmitting a frequency modulated, continuous wave RF signal used to detect said transmitted acoustic signal;
 c) receiving antenna means for receiving a reflection of said RF signal from said acoustic signal as a reflected RF signal;
 d) RF subsystem means for supplying said RF signal to said RF transmitting antenna means and for receiving said reflected RF signal from said receiving antenna means, said RF subsystem means including:
  i) RF sweep generator means for producing a frequency modulated, continuous wave RF signal,
  ii) homodyne receiver means for receiving said reflected RF signal and for producing an output audio signal in response thereto, and
  iii) distribution means for supplying said frequency modulated, continuous wave RF signal from said RF sweep generator means to said RF transmitting antenna means for transmission thereby, and to said homodyne receiver means as a local oscillation signal so that said received reflected RF signal is phase coherent with the transmitted frequency modulated, continuous wave RF signal;
 e) programmable filter means for filtering out undesirable frequency components of the output audio signal from said homodyne receiver means;
 f) analog-to-digital conversion means for digitally converting and deliberately aliasing said filtered output audio signal under a controlled set of radar and digital sampling parameters;
 g) central processing means for determining the temperature profile of the atmosphere in response to said filtered and aliased output audio signal;
 h) array processor means for spectrally analyzing said digitized signal from said analog-to-digital conversion means via a Fourier transform so that said central processing means can analyze said signal; and
 i) acoustic sweep generator means for producing a frequency modulated, continuous wave acoustic signal and for supplying said frequency modulated, continuous wave acoustic signal to said acoustic transmitting antenna means, in response to said central processing means.

12. A radio acoustic sounding system according to claim 11, further including amplifier means for amplifying said frequency modulated, continuous wave RF signal supplied to said RF transmitting antenna means from said RF sweep generator means.

13. A radio acoustic sounding system according to claim 11, further including low noise amplifier means for boosting the received RF signal supplied from said receiving antenna means to said RF subsystem means.

14. A radio acoustic sounding system according to claim 11, wherein said programmable filter means is connected to said central processing means and controlled thereby.

15. A radio acoustic sounding system according to claim 11, wherein said RF sweep generator means includes synthesizer means for generating a swept frequency signal in response to said central processing means, and phase-locked loop means for phase locking said swept frequency signal to produce said frequency modulated, continuous wave RF signal.

16. A radio acoustic sounding system according to claim 15, wherein said frequency modulated, continuous wave RF signal has a frequency in the range of 2.8 to 3.0 GHz.

17. A radio acoustic sounding system according to claim 11, further including antenna positioning means for positioning said RF transmitting antenna means and said receiving antenna means in response to said central processing means.

18. A method of detecting temperature profiles in the atmosphere, comprising the steps of:
 a) transmitting an acoustic signal;
 b) producing a frequency modulated, continuous wave RF signal;
 c) transmitting said frequency modulated, continuous wave RF signal for detecting said transmitted acoustic signal;
 d) receiving a reflection of said RF signal from said acoustic signal as a reflected RF signal;
 e) producing an output audio signal from said reflected RF signal, that is phase coherent with the transmitted frequency modulated, continuous wave RF signal;
 f) filtering out undesirable frequency components of the output audio signal;
 g) deliberately aliasing said filtered output audio signal by converting said audio signal to digital form under a controlled set of radar and digital sampling parameters; and
 h) determining the temperature profile of the atmosphere in response to said filtered and aliased output audio signal.

19. A method according to claim 18, further comprising the step of producing a frequency modulated, continuous wave acoustic signal as said transmitted acoustic signal.

20. A method according to claim 18, wherein said step of producing a frequency modulated, continuous wave RF signal includes the steps of generating a swept frequency signal, and phase locking said swept frequency signal to produce said frequency modulated, continuous wave RF signal.

21. A method according to claim 18, wherein said frequency modulated, continuous wave RF signal has a frequency in the range of 2.8 to 3.0 GHz.

22. A method according to claim 18, further comprising the step of spectrally analyzing said digitized signal via a Fourier transform prior to determining the temperature profile.

23. A method according to claim 22, further including the step of performing a time-domain Hanning window function on said spectrally analyzed digital signal.

24. A method according to claim 23, further including the step of computing the power spectra of said spectrally analyzed digital signal.

25. A method according to claim 24, further including the step of averaging the computed power spectra to improve the signal-to-noise (S/N) ratio of the signal.

26. A method according to claim 25, further including the step of removing spurious and large return signals from scatterers other than clear air turbulence from said averaged signal.

27. A method according to claim 26, further including the step of computing spectral moments, which constitute a parameterized description of a spectral peak which is hypothesized to be caused by scattering from atmospheric turbulence of a radio acoustic sounding system wave.

* * * * *